FIG. 2a.

3,223,363
AIRCRAFT FLIGHT SYSTEMS
Geoffrey Francis Boothby, Kenneth Fearnside, and Heinz Pollak, all of Cheltenham, England, assignors to S. Smith & Sons (England) Limited, London, England, a British company
Filed Nov. 15, 1963, Ser. No. 324,118
20 Claims. (Cl. 244—77)

This invention relates to aircraft flight systems, and is particularly concerned with aircraft flight systems for use during landing manoeuvres.

Aircraft flight systems which provide demands for the control of an aircraft during a landing manouvre are known, and normally involve use of a radio-defined approach path to the runway where the landing is to be made. The approach path in such circumstance lies in the vertical plane containing the centre-line of the runway and descends at a steady rate towards the runway, this path being terminated, from a height of for example some fifty feet above the runway and in the same vertical plane, by a "flared" path, that is to say, a path that becomes progressively less steep towards the runway so as to obtain a smooth touchdown of the aircraft. The demands provided are those which are required to fly along the approach path with the aircraft level in bank, apart from any manoeuvres that may be required to correct for lateral displacement of the aircraft from the approach path. The tendency of any cross-wind component to displace the aircraft laterally from the approach path is counteracted by heading the aircraft partly into the wind so that the cross-wind component is balanced by a component of the forward motion of the aircraft. Where the aircraft is headed into the wind in this manner it is necessary just prior to touchdown to remove the angular difference between its heading and ground track, that is to say, to remove the drift angle. Such an operation, which is known as kicking-off drift (or de-crabbing), is required to be performed rapidly, and in the event of a strong cross-wind component can involve a demand for yaw which requires a large movement of the rudder of the aircraft, together with compensating movement of the ailerons to maintain the aircraft with wings level.

It is an object of the present invention to provide an aircraft flight system for use during a landing manoeuvre and which may be used at least to reduce the requirement for large rudder movement.

According to the present invention, in an aircraft flight system for us during a landing manoeuvre, a demand for bank of the aircraft is arranged to be dependent upon acceleration of the aircraft athwartships such that when the aircraft is banked in accordance with the demand, the tendency of any cross-wind component to displace the aircraft laterally from a predetermined approach path is counteracted at least partly by sideslip of the aircraft into the wind.

With a system in accordance with the present invention it is necessary prior to touchdown to remove bank by rolling the aircraft to the wings-level condition and this requires movement of the ailerons, but the aileron movement required is generally small compared with the rudder movement required for kicking-off drift with the prior systems. Furthermore, the response of the aircraft is, in general, faster in roll than in yaw.

The present system may be arranged so that the heading of the aircraft is aligned with the approach path irrespective of any cross-wind component, the tendency of any such component to displace the aircraft from the approach path being counteracted in effect completely by sideslip of the aircraft into the wind. In these circumstances the lateral force and rolling and yawing moments may be regarded as being balanced respectively by the bank angle, the aileron angle, and the rudder angle of the aircraft. This is in fact an over-simplification, and, for example, the rudder helps to balance the lateral force. However, there is the advantage that the rudder angle which is required to prevent yaw when the aircraft is brought to the wings-level condition is substantially the same as that which is required for flight along the approach path, a small movement of the ailerons being substantially all that is required to prepare the aircraft for touchdown.

Alternatively, the present system may be arranged so that only part of the effect of a cross-wind component is counteracted by sideslipping, the remainder being counteracted by heading the aircraft partly into the wind. In these circumstances, it is necessary prior to touchdown to remove the drift angle as well as to roll the aircraft to the wings-level condition, but the drift angle in this case is of course less than if, as in the prior systems, the aircraft were maintained level in bank throughout the approach.

In order to avoid excessive rolling of the aircraft it is preferred that the aircraft be settled on the approach path before use is made of sideslip for counteracting crosswind. For example, where a conventional ILS (Instrument Landing System) landing manoeuvre is used it is preferred that the aircraft be settled in the glide phase before being controlled in accordance with the bank demand. In this connection a conventional ILS landing manoeuvre comprises five phase: a first, the track phase, in which the aircraft flies at a substantially constant height and obtains guidance in azimuth from the localiser radio beam of an ILS system; a second, the glide phase, in which the aircraft continues to be guide in azimuth by the localiser beam and obtains guidance in pitch from the glidepath radio beam of the ILS system, the glidepath and localiser beams together defining an approach path which descends (for example, at some three degrees to the horizontal) towards the runway where the landing is to be made; a third, the attitude phase, which commences at a height from which the glidepath beam is no longer useable because of noise, and in which the aircraft flies along an extension of the glide path; a fourth, the flare phase, in which the aircraft from a height of, for example, fifty feet commences the flare out; and the fifth, the land phase, in which the flare out is completed, and, from a height of some ten to twenty feet, the aircraft is brought to the condition in which it is heading along the runway with wings level ready for touchdown. Throughout the attitude and flare phases guidance of the aircraft in azimuth may still be obtained from the localiser radio beam; however, resort may be made to use of a leader-cable guidance system as described, for example, in British patent specification No. 820,319.

According to a feature of the present invention an aircraft flight system for use during a landing manoeuvre comprises means for providing a measure of displacement of the aircraft laterally from a predetermined approach path, means for providing a measure dependent upon acceleration of the aircraft athwartships, and means for deriving in dependence upon both said measures a demand for bank of the aircraft such that when the aircraft is banked in accordance with the demand any said lateral displacement is thereby reduced towards zero and the tendency of any cross-wind component to displace the aircraft laterally from said approach path is counteracted at least partly by sideslip of the aircraft into the wind.

The means for providing said measure of acceleration may be an accelerometer mounted athwartships of the aircraft. Preferably the accelerometer is a pendulum unit for providing a measure of the angle by which a pendulum mounted for angular displacement about an axis aligned with the roll axis of the aircraft is displaced from a datum axis parallel to the yaw axis of the aircraft.

The derived bank-demand, which demand may be computed as a measure of the actual angle of bank required of the aircraft, may be used to provide directions to a human pilot of the aircraft, or alternatively may be used to derive a demand for automatic control of the ailerons of the aircraft.

According to another aspect of the present invention an aircraft flight system for use during a landing manoeuvre comprises a servo channel which is arranged to provide a demand signal for controlling ailerons of the aircraft, means for supplying to the aileron channel a first signal dependent upon displacement of the aircraft laterally from a predetermined approach path, and means for supplying to the aileron channel a second signal dependent upon acceleration of the aircraft athwartships, the arrangement being such that the demand provided by the aileron channel is dependent upon said first and second signals such as to tend to reduce said displacement to zero, and in the steady state maintain it at zero, by bank of the aircraft.

An aircraft flight system in accordance with the present invention, and which includes two servo channels for effecting control of the rudder and ailerons respectively of an aircraft, will now be described, by way of example, with reference to the accompanying drawings in which:

FIGURE 2, which figure is divided into left- and right-hand parts indicated as FIGURES 2a and 2b respectively, shows the servo channel for effecting control of the ailerons together with further instruments of the flight system.

The rudder and aileron channels form part of an automatic pilot which can be engaged to control the aircraft in cruising flight as well as to perform an ILS landing manoeuvre, however the two channels are shown in the drawings in the configurations to which they are switched at some time during the glide phase of an ILS landing manoeuvre. The other configurations to which they are switched during cruising flight and the track phase are conventional and are not described. In addition, the automatic pilot includes a servo channel for effecting control of the elevators of the aircraft; however, this is not described in the present specification since details of its construction are not directly relevant to the present invention and may, for example, be as described in a paper entitled "Blind Landing" by W. J. Charnley, published in the Journal of The Institute of Navigation, Volume XII, 1959, pages 115 to 135, or alternatively as described in either D. W. Righton's U.S. patent application Serial No. 209,623 for Automatic Control Systems, filed July 13, 1962, now U.S. Pat. No. 3,190,586 or J. L. Weston's U.S. patent application Serial No. 266,615 for Automatic Control Systems for Aircraft, filed March 20, 1963, now abandoned. The switching which is required from one mode to another in the rudder and aileron channels may be effected under the control of a switch arrangement in the elevator channel which operates in the manner of the mode switches described in the above-mentioned U.S. patent application Serial No. 209,623.

The aileron and rudder channels are switched to the configurations shown in the drawings after completion of the track phase of the landing manoeuvre, but before the end of the glide phase. The switching is accomplished, under the control of a radio altimeter associated with the elevator channel, to take place during the glide phase at a time which is sufficiently after the start of the glide phase as to ensure that the aircraft is settled in this phase, and sufficiently before the end of the glide phase as to ensure that the aircraft is in a steady state on the ILS approach path at the commencement of the attitude phase.

Figure 1:
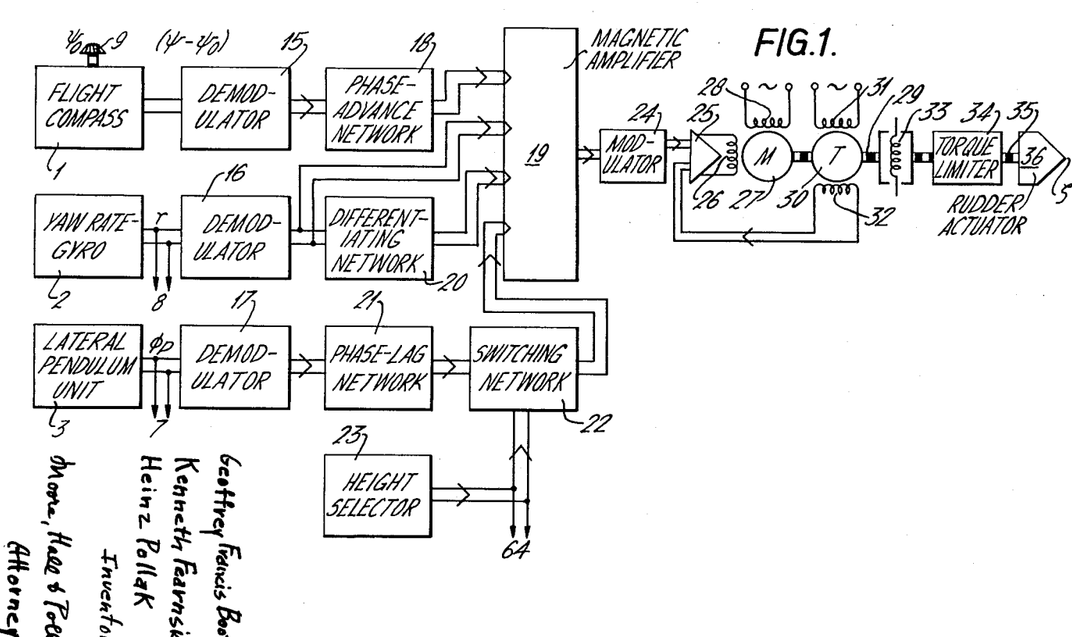
FIGURE 1 shows, in combination with certain instruments of the aircraft, the servo channel for effecting control of the rudder.

The rudder channel when switched to the configuration shown in FIGURE 1 is operative in one or the other of two modes according to the setting of a mode-selector (which may be set manually or automatically). In a first of the two modes, referred to as the "sideslipping" mode, compensation for cross-wind is made substantially wholly by sideslipping the aircraft into the wind. In the other mode, referred to as the "mixed" mode, the compensation is made both by side-slipping and heading the aircraft partly into the wind, the ground track of the aircraft in both cases being aligned with the centre-line of the runway.

Whichever of the "sideslipping" and "mixed" modes is selected, the operation of the rudder and aileron channels does not change throughout the attitude and flare phases. When however, the aircraft has descended in the flare manoeuvre to the height selected for the land phase the aileron channel is switched to a condition in which it acts to eliminate all bank so as to bring the aircraft to the wings-level condition. Switching also occurs in the rudder channel if the "mixed" mode has been selected and this is effective to eliminate any drift angle that may occur in this mode, such an operation being comparable with the conventional kicking-off-drift procedure.

The automatic pilot including the rudder and aileron channels is basically a "rate-rate" system and accordingly these two channels provide output signals which are representative of demands for rates of movement of the rudder and ailerons respectively.

Figure 2A:
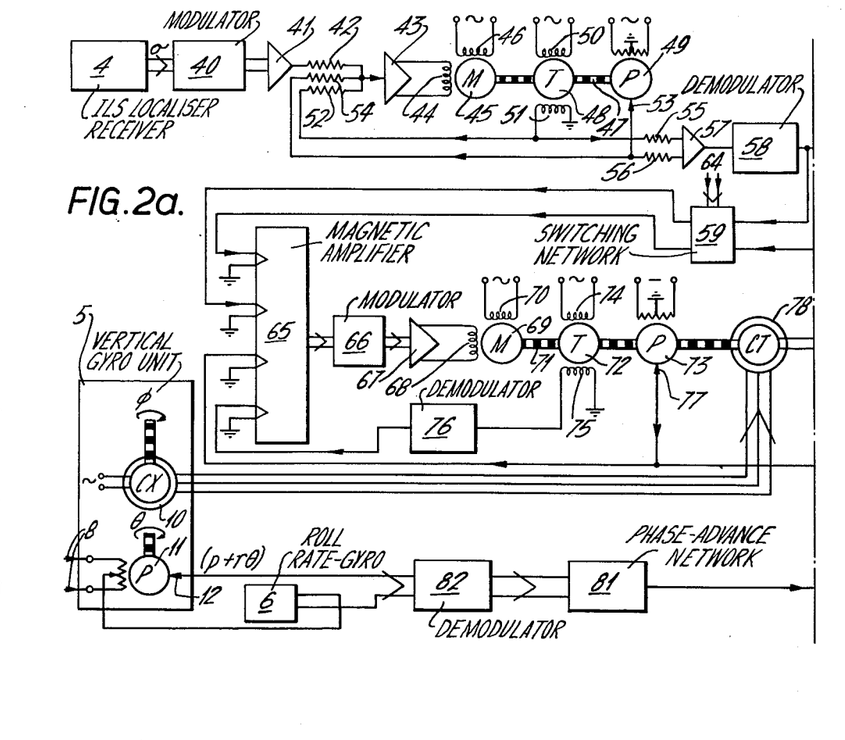
Figure 2B:
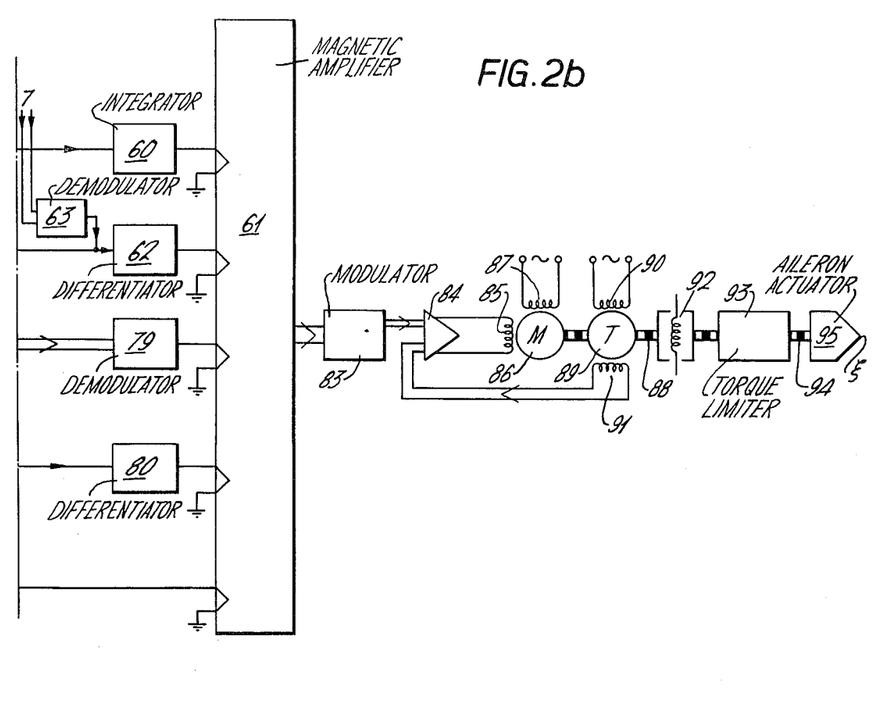

Referring to FIGURES 1 and 2, the rudder channel effects control of the aircraft rudder in dependence upon electric signals it receives from a flight compass 1, a yaw rate-gyroscope 2 and a lateral pendulum unit 3. The aileron channel on the other hand effects control of the aircraft ailerons in dependence upon electric signals it receives from an ILS localiser receiver 4, a vertical gyroscope unit 5, and a roll rate-gyroscope 6, as well as upon the signal supplied by the lateral pendulum unit 3, this latter signal being applied to the aileron channel via a pair of leads 7. In this connection also, one of two signals supplied from the vertical gyroscope unit 5 to the aileron channel is derived in dependence upon the signal supplied by the yaw rate-gyroscope 2, such signal being applied to the vertical gyroscope unit 5 via a pair of leads 8.

Except in the case of the signal supplied by the ILS localiser receiver 4, the signals supplied to the rudder and aileron channels are alternating current signals having a frequency of four hundred cycles per second. These alternating current signals are all derived from alternating current of constant amplitude (supplied by a source not shown) which is also supplied, as a datum phase, to the rudder and aileron channels together with alternating current, of constant amplitude, which has a phase in quadrature with the datum.

The flight compass 1 is a conventional gyromagnetic compass which has a manual control 9 that enables a setting according to a desired heading to be made. Prior to an automatic landing manoeuvre the control 9 is set in accordance with the heading $\psi_0$ which is required to align the aircraft with the centre-line of the runway where the landing is to be made. The compass 1 supplies to the rudder channel an alternating current signal modulated in amplitude in accordance with the difference $(\psi - \psi_0)$ between the actual heading $\psi$ of the aircraft and the set heading $\psi_0$.

The lateral pendulum unit 3, which acts essentially as an accelerometer responsive to acceleration athwartships of the aircraft, includes a pendulum (not shown) which is mounted for angular displacement about an axis aligned with the roll axis of the aircraft, such pendulum being thereby responsive to athwartship acceleration of the aircraft as well as to gravity. The signal which is supplied to the aileron and rudder channels by the unit 3 is an alternating current signal modulated in amplitude in accordance with the angular displacement $\phi_p$ of the pendulum relative to a datum axis that is parallel to the yaw axis of the aircraft.

The gyroscopes 2 and 6 are conventional rate-gyroscopes which supply alternating currents modulated in amplitude in accordance with the rates of rotation of the aircraft about their respective input axes. The input axis of the gyroscope 2 is aligned with the yaw axis of the aircraft and the input axis of the gyroscope 6 is aligned with the roll axis of the aircraft, so that the signals supplied by the gyroscopes 2 and 6 are dependent respectively upon the rate of yaw $r$ and the rate of roll $p$ relative to the aircraft axes. The gyroscope unit 5 includes in addition to a conventional vertical gyroscope (not shown) two pick-off devices 10 and 11 which receive respectively from the vertical gyroscope representations of the bank angle $\phi$ and pitch angle $\theta$ of the aircraft relative to gravity axes. The pick-off device 10, which is a synchro control transmitter, is energised with the alternating current of datum phase and supplies to the aileron channel a three-component signal dependent upon the represented bank angle $\phi$. The pick-off device 11, which is a variable potentiometer having a tap 12 adjusted in accordance with the representation of pitch angle $\theta$, is however energised, via the leads 8, by the signal which is dependent upon the yaw rate $r$ and which is supplied by the yaw rate-gyroscope 2. The signal dependent upon $(r\theta)$ thereby derived at the tap 12 is added in series with the signal which is dependent upon the roll rate $p$ and which is supplied by the roll rate-gyroscope 6. The combined signal which is supplied to the aileron channel from the unit 5 and gyroscope 6 is as a result an alternating current signal modulated in amplitude in accordance with the expression $(p+r\theta)$.

The receiver 4 is a conventional ILS localiser radio receiver for use in receiving signals from the localiser beam transmitted by an ILS radio beacon near the runway where the landing is to be made. The receiver 4, in accordance with the radio signals it receives, supplies to the aileron channel a direct current signal which is dependent upon the angular displacement $\sigma$ measured in azimuth and with respect to the beacon, of the aircraft from the centre-line of the runway.

The rudder channel in response to the signals it receives provides a demand for rudder movement in accordance with the basic control law:

$$(D\zeta)_d = H_1 Dr + H_2 r + H_3[f_1(D)(\psi-\psi_0) - kf_2(D)\phi_p] \quad (i)$$

where:
$(D\zeta)_d$ is demanded rate of change of rudder-angle $\zeta$, $D$ being the operator representative of differentiation with respect to time;
$H_1$, $H_2$ and $H_3$ are control constants;
$f_1(D)$ is the function $(1+N_1\tau_1 D)/(1+\tau_1 D)$ of the differential operator $D$, $N_1$ being a numerical constant and $\tau_1$ a constant having the dimension of time;
$f_2(D)$ is the function $1/(1+\tau_2 D)$ of the differential operator $D$, $\tau_2$ being a constant with the dimension of time; and
$k$ is a numerical constant, the value of which in the event of selection of the "sideslipping" mode is arranged to be zero throughout, and in the event of selection of the "mixed" mode has a finite value until the commencement of the land phase whereupon its value is arranged to be zero.

The aileron channel in response to the signals it receives provides a demand for aileron movement in accordance with the basic control law:

$$(D\xi)_d = F_1[f_3(D)D\phi - D\phi_d + (\phi-\phi_d)/\tau_4] - F_2 D\phi_p - D\phi_b \quad (ii)$$

where:
$(D\xi)_d$ is the demanded rate of change of aileron—angle $\xi$;
$F_1$ and $F_2$ are numerical constants;
$f_3(D)$ is the function $(1+N_3\tau_3 D)/(1+\tau_3 D)$ of the differential operator $D$, $N_3$ being a numerical constant and $\tau_3$ a constant with the dimension of time;
$D\phi$ is the rate of roll of the aircraft with respect to gravity axes, such rate being, to a satisfactory degree of approximation, equal to the expression $(p+r\theta)$;
$\phi_d$ is a demanded bank angle (so that $D\phi_d$ is accordingly a demanded rate of roll) which is required of the aircraft to eliminate angular displacement $\sigma$ and to compensate, wholly in the case of the "sideslipping" mode, and partly in the case of the "mixed" mode, for the effect of any cross-wind, this demand, which is reduced to zero value at the commencement of the land phase, being given by the expression:

$$[-k_1/(1+\tau_5 D)][1+\tau_6 D/(1+\tau_7 D)]\sigma + \phi_p/(1+\tau_5 D) \quad (iii)$$

where $k_1$ is a numerical constant and $\tau_5$, $\tau_6$ and $\tau_7$ are constants with the dimension of time; and
$D\phi_b$ is the rate of roll required of the aircraft in order to effect balancing of the channel, this rate being given by the expression:

$$[-k_1/\tau_{10}\tau_{11}D][1+\tau_6 D/(1+\tau_7 D)]\sigma \quad (iv)$$

$\tau_{10}$ and $\tau_{11}$ being constants having the dimension of time.

The rudder and aileron channels themselves will now be described in detail with reference to FIGURES 1 and 2, the rudder channel as shown in FIGURE 1 being described first.

Referring to FIGURE 1, the signals supplied by the flight compass 1, the yaw rate-gyroscope 2, and the pendulum unit 3 are applied within the rudder channel to three demodulators 15, 16 and 17 respectively. Each demodulator 15, 16 and 17 derives from the signal it receives a corresponding direct current signal, and in the case of the demodulator 15 the derived signal, dependent upon the heading error $(\psi-\psi_0)$, is applied via a phase-advance network 18 to a first of four control windings of a magnetic amplifier 19. The phase-advance network 18 has a transfer function $(1+N_1\tau_1 D)/(1+\tau_1 D)$, that is to say $f_1(D)$, so that the control-component signal applied thereby to the magnetic amplifier 19 is dependent upon $f_1(D)(\psi-\psi_0)$.

The demodulator 16 in accordance with the signal it receives from the yaw rate-gyroscope 2 derives a direct current signal dependent upon the yaw rate $r$ of the aircraft. This signal is applied directly to a second of the four control windings of the magnetic amplifier 19, and also to a differentiating network 20. The signal dependent upon $(Dr)$ which is derived by the differentiating network 20 is supplied to the third control winding of the magnetic amplifier 19, so that the control-component signals applied to said second and third control windings are dependent respectively upon $r$ and $(Dr)$.

The demodulator 17 in accordance with the signal it receives from the pendulum unit 3 derives a direct current signal dependent upon the pendulum angle $\phi_p$. This signal is supplied via a phase-lag network to a switching network 22, the phase-lag network 21 having a transfer function $1/(1+\tau_2 D)$, that is to say, $f_2(D)$. The switching network 22 is operative to pass the signal from the network 21 to the fourth control winding of the magnetic amplifier 19 only in the circumstances in which the "mixed" mode of landing manoeuvre has been selected and the aircraft has not yet descended to the height at which drift and bank are to be eliminated. In this connection, the switching network 22 is coupled (by means not shown) to the mode selector of the automatic pilot and is responsive to a signal supplied by a height selector 23, the selector 23 in its turn being responsive to a signal representative of height of the aircraft which is supplied by the radio altimeter (not shown). The height selector 23 is set in accordance with the height at which drift and bank are to be eliminated, and supplies a signal current which has an amplitude that changes from a first to a second level when according to the signal received from the radio altimeter the aircraft has descended to the set height. When the "mixed" mode has been selected, the switching network 22 passes on to the magnetic amplifier 19, as a control-component signal, the signal dependent upon $f_2(D)\phi_p$ which is derived by the network 21, and this situation continues until there is the change from the first to the second level in the signal current from the selector 23. After this change, or where the "sideslipping" mode is selected, no signal is supplied to the magnetic amplifier 19 from the network 22 (this corresponding to the condition in which $k$ of control law (i) is zero). Any control-component signal supplied from the network 22 to the magnetic amplifier 19 is supplied in the opposite sense to the three other control-component signals.

The magnetic amplifier 19 supplies a direct current signal which is dependent upon the four control-component signals, and this signal is applied to a modulator 24 to modulate a carrier signal of the datum phase. The modulated carrier is supplied as an input demand to a servo amplifier 25 which controls energisation of a control-phase winding 26 of a two-phase servo-motor 27. The motor 27, which has a reference-phase winding 28 energised with alternating current of the quadrature phase, drives a shaft 29. A tachometer generator 30, which has its stator winding 31 energised by alternating current of the datum phase, is coupled to the shaft 29 so that the alternating current signal which is induced in its rotor winding 32 is modulated in amplitude in accordance with the rate of rotation of the shaft 29. This latter signal is supplied to the servo amplifier 25 as degenerative rate-feedback, with the result that the motor 27 rotates the shaft 29 at a rate dependent upon the input demand to the amplifier 25. This rate is in accordance with the rate of rudder movement demanded by control law (i)— the constant $k$ in this law being zero in the circumstances when no control-component signal is supplied to the magnetic amplifier 19 via the network 22.

The shaft 29 is coupled through an electromagnetic clutch 33, and thence through a torque limiter 34, to a shaft 35. The shaft 35 drives an actuator 36, for example an hydraulic actuator, for controlling the rudder angle $\zeta$ of the aircraft. The actuator 36 is therefore controlled to provide the demanded rate of change of rudder angle, $(D\zeta)_d$, given by control law (i).

The clutch 33 is energised so as to transmit drive from the shaft 29 to the shaft 35, by means of an energisation circuit (not shown) which is completed by a switch that is closed for so long as the rudder channel is required to control rudder movements. The torque limiter 34 on the other hand is effective to limit to a safe value the load which is imposed upon the shaft 35. In this connection, the torque limiter 34 may be effective to interrupt temporarily or permanently, depending upon the magnitude of the torque, the supply of energisation current to the clutch 33 and may be provided together with the clutch 33 by an arrangement as described in British patent specification No. 929,761.

The aileron channel will now be described in detail with reference to FIGURE 2.

Referring to FIGURE 2, the signal dependent upon angular displacement $\sigma$ and supplied by the ILS localiser receiver 4 is applied in the aileron channel to a modulator 40 to modulate in amplitude a carrier signal of the datum phase. The modulated signal derived by the modulator 40 is supplied to an amplifier 41, and the resulting amplified signal is applied, with respect to earth and via a resistor 42, as an input demand to a servo amplifier 43. The servo amplifier 43 controls the energisation of the control-phase winding 44 of a two-phase servo motor 45 which has its reference-phase-winding 46 energised by alternating current of the quadrature phase. The motor 45 drives a shaft 47 to which a tachometer generator 48 and a potentiometer 49 are both coupled. Alternating current of the datum phase is applied to energise the tachometer generator 48 and the potentiometer 49, this energisation current being applied in the tachometer generator 48 to its stator winding 50 with the result that the signal induced in its rotor winding 51 is modulated in amplitude in accordance with the rate of rotation of the shaft 47. The signal induced in the rotor winding 51 is applied, with respect to earth and via a resistor 52, to the amplifier 43 as degenerative rate-feed-back. The signal which, on the other hand, is derived by the potentiometer 49 at its movable tap 53 is modulated in amplitude in accordance with the angular position of the shaft 47, and this signal is applied, with respect to earth and via a resistor 54, to the amplifier 43 as degenerative position-feedback. As a result of the rate- and position-feedback signals applied to the amplifier 43 via the resistors 52 and 54, the motor 45 is controlled to rotate the shaft 47 to an angular position $\sigma_s$ which is dependent upon:

$$[\sigma/(1+\tau_7 D)]$$

The signal dependent upon $(D\sigma_s)$ which is induced in the rotor winding 51 of the tachometer generator 48, and the signal dependent upon $\sigma_s$ which is derived by the potentiometer tap 53, are applied with respect to earth and via resistors 55 and 56 respectively to an amplifier 57. These two signals are applied to the amplifier 57 in the same sense as one another, and the resulting amplified signal is applied to a demodulator 58. The demodulator 58, in accordance with the sum of the two signals supplied to the amplifier 57, derives a direct current signal dependent upon:

$$(1+\tau'_7 D)\sigma_s$$

($\tau'_7$ being a constant with the dimension of time) that is to say, dependent upon:

$$[1+\tau_6 D/(1+\tau_7 D)]\sigma$$

where $\tau_6 = \tau'_7 - \tau_7$.

This direct current signal is applied, with respect to earth, to a switching network 59 and also to an integrator 60. The integrator 60 derives from this signal a signal which is in accordance with expression (iv) and this latter signal is applied, as a control-component signal, to a first of five control windings of a magnetic amplifier 61.

A signal dependent upon $(D\phi_p)$ is applied, with respect to earth, to a second of the control windings of the magnetic amplifier 61 by a differentiator 62. The differentiator 62 derives this signal from a direct current signal dependent upon $\phi_p$ which it receives from a demodulator 63 and which is derived by the demodulator 63 from the signal supplied via the leads 7 by the pendulum unit 3 (FIGURE 1). The signal dependent upon $\phi_p$, in addition to being applied to the differentiator 63, is applied, with respect to earth, to the switching network 59.

The switching network 59 receives via leads 64 the signal current which is supplied by the height selector 23 (FIGURE 1), and passes the two signals it receives from the demodulators 63 and 58 to first and second control windings respectively of a magnetic amplifier 65 only when the signal current has its first amplitude level. When the signal current has its second amplitude level, that is to say when the aircraft has descended to the height set in the selector 23 (FIGURE 1), neither signal is supplied to the magnetic amplifier 65, the first and second control windings of the magnetic amplifier 65 being both short-circuited directly to earth by the switching network 59 in these circumstances.

The magnetic amplifier 65 supplies direct current to a modulator 66 to modulate a carrier signal of the datum phase. The modulated carrier is supplied to a servo amplifier 67 which controls energisation of a control-phase winding 68 of a two-phase servo motor 69. The motor 69, which has a reference-phase winding 70 energised with alternating current of the quadrature phase, drives a shaft 71 to which a tachometer generator 72 and a potentiometer 73 are both coupled. The tachometer generator 72 has its stator winding 74 energised by alternating current of the datum phase, and the alternating current signal induced in its rotor winding 75, which signal is modulated in amplitude in accordance with the rate of rotation of the shaft 71, is applied to a demodulator 76 so as to derive the corresponding direct current signal. The potentiometer 73, on the other hand, is energised by direct current, the signal derived by its movable tap 77 being dependent upon the angular position of the shaft 71. The direct current signals derived by the potentiometer tap 77 and the demodulator 76 are supplied, with respect to earth, to third and fourth control windings respectively of the magnetic amplifier 65 to provide degenerative position- and rate-feedback.

In the circumstances in which the switching network 59 passes the two signals supplied by the demodulators 63 and 58 to the magnetic amplifier 65, the motor 69 drives the shaft 71 to an angular position in accordance with expression (iii), that is to say, in accordance with the demanded bank angle $\phi_d$ as dependent upon the angular displacement $\sigma$ and the pendulum angle $\phi_p$. When on the other hand signals are not applied to the magnetic amplifier 65 from the network 59, the input demand to this servo system is effectively zero so that the motor then drives the shaft 71 to its "zero" position (corresponding to a zero bank demand, $\phi_d=0$) as required at this time, and maintains it there.

A synchro control transformer 78 which is coupled to the shaft 71 has its stator energised by the three-component signal dependent upon the actual bank angle $\phi$ which is supplied by the synchro control transmitter 10 of the vertical gyro unit 5. In response to this signal and the angular position $\phi_d$ of the shaft 71, a signal modulated in amplitude in accordance with the difference $(\phi-\phi_d)$ between the actual and demanded bank angles is supplied from the rotor of the synchro transformer 78 to a demodulator 79. The direct current signal dependent upon $(\phi-\phi_d)$ derived by the demodulator 79 is applied, with respect to earth, to a third control winding of the magnetic amplifier 61.

A direct current signal dependent upon the rate of change of demanded bank angle, $(D\phi_d)$, is supplied, with respect to earth, to a fourth control winding of the magnetic amplifier 61. This signal is derived by a differentiator 80 from the signal which is dependent upon the angular position $\phi_d$ of the shaft 71, and which appears at the potentiometer tap 77.

The fifth control winding of the magnetic amplifier 61 is supplied with a direct current signal which is derived by a phase-advance network 81 from a direct current signal supplied by a demodulator 82. The demodulator 82 receives the alternating current signal which is modulated in accordance with the expression $(p+r\theta)$, and which is provided by the interconnection of the roll rate-gyroscope 6 with the potentiometer tap 12 of the vertical gyroscope unit 5. The expression $(p+r\theta)$ is a satisfactory approximation to the rate of change of the bank angle $\phi$ where, as in the present case, the pitch angle $\theta$ of the aircraft is normally small, for example less than ten degrees. The direct current signal derived by the demodulator 82, and supplied through the phase-advance network 81 to the fifth control winding of the magnetic amplifier 61, is thus taken as dependent upon the rate $(D\phi)$. The phase-advance network 81 has a transfer function $(1+N_3\tau_3D)/(1+\tau_3D)$, that is to say $f_3(D)$, so that the control-component signal supplied to the fifth control winding is dependent upon $f_3(D)(D\phi)$.

The two control-component signals which are supplied to the said third and fifth control windings of the magnetic amplifier 61, from the demodulator 79 and network 81 respectively, are supplied in the opposite sense to the other three control-component signals, and the magnetic amplifier 61 in dependence upon its five control-component signals supplies a direct current signal which is in accordance with the rate of aileron movement demanded by Equation (ii). This signal is applied to a modulator 83 to modulate a carrier signal of the datum phase, the modulated carrier being supplied to a servo amplifier 84 which controls energisation of a control-phase winding 85 of a servo motor 86. The motor 86, which has a reference-phase winding 87 energised with alternating current of the quadrature phase, drives a shaft 88. A tachometer generator 89 is coupled to the shaft 88 and has its stator winding 90 energised with alternating current of the datum phase, so that the alternating current of the datum phase, so that the alternating current signal which is induced in its rotor winding 91 is modulated in amplitude in accordance with the rate of rotation of the shaft 88. This latter signal is supplied to the servo amplifier 84 as degenerative rate-feedback, with the result that the motor 86 rotates the shaft 88 at a rate in accordance with the rate of aileron movement demanded by control law (ii).

The shaft 88 is coupled through an electromagnetic clutch 92, and thence through a torque limiter 93 to a shaft 94. The shaft 94 drives an actuator 95, for example an hydraulic actuator, for controlling the aileron angle $\xi$ of the aircraft. The actuator 95 is therefore controlled to provide the demanded rate of change of aileron angle, $(D\xi)_d$, given by control law (ii).

The clutch 92 is energised so as to transmit drive from the shaft 88 to the shaft 94 by means of an energisation circuit (not shown) which is completed by a switch that is closed for so long as the aileron channel is required to control aileron movements. The torque limiter 93 is effective, as in the case of the torque limiter 34 (FIGURE 1), to limit to a safe value the load which is imposed upon the shaft 94, and may be provided together with the clutch 92 by an arrangement as described in the aforementioned British patent specification No. 929,761.

The operation of the rudder and aileron channels as these are shown in FIGURES 1 and 2, commences during the glide phase of an ILS approach when the aircraft is already positioned on the radio-defined approach path. Assuming firstly that the "sideslipping" mode has been selected, the demand $(D\zeta)_d$ applied to the rudder actuator 36, being dependent basically upon the compass heading error $(\psi-\psi_0)$ and being independent in this mode of any pendulum angle $\phi_p(k=0)$, is effective to maintain the aircraft with its heading aligned with the approach path, and thus, with the centre-line of the runway. The components of the rudder demand which are dependent upon $r$ and $(Dr)$ provide for stability of the rudder channel.

The demand $(D\xi)_d$ applied to the aileron actuator 95, on the other hand, is effective to bank the aircraft in accordance with the demanded bank angle $\phi_d$ derived in dependence upon the angular displacement $\sigma$ of the aircraft from the approach path and the angular displacement $\phi_p$ of the pendulum in the unit 3. The composition of the bank demand is best considered for the steady state in which the aircraft is flying centrally on the approach path ($\sigma=0$) without either velocity or acceleration athwartships, the tendency of any cross-wind to give rise to acceleration athwartships being counteracted by bank of the aircraft. In this steady state the pendulum hangs vertically downwards so that the angle $\phi_p$ is equal to the actual bank angle $\phi$. If now there is a change in magnitude of the cross-wind component, acceleration of the aircraft athwartships results and the pendulum is displaced away from the vertical, such displacement providing a measure of the acceleration and giving rise to a demand for an appropriate manoeuvre in bank to restore the equality between the pendulum angle $\phi_p$ and the bank angle $\phi$. In addition, any lateral displacement of the aircraft from the centre of the approach path gives rise to a demand for a bank manoeuvre to restore the angular displacement $\sigma$ to zero. The use of the pendulum component in the bank demand assists in the capturing of the central position by improving the dynamic response of the system.

When the aircraft is sideslipping it is necessary to counter the tendency of the aircraft to roll by holding the ailerons at an appropriate angle. The component $F_2D\phi_p$ of the aileron-demand assists in the acquisition of this angle, the pendulum angle $\phi_p$ providing to a substantial degree a measure of sideslip. This component tends to improve the dynamic response of the system and to avoid large transient excursions of the aircraft from the centre of the approach path.

The component $D\phi_b$ included in the aileron demand is required to ensure that the aileron channel is balanced. In this respect, this component although weak is effective to balance out any beam errors arising for example due to errors in the measure of acceleration provided by the lateral pendulum unit 3, or in the "gearing," that is to say scaling, used to relate the pendulum angle $\phi_p$ to the actual bank angle $\phi$. Such errors tend to give rise to displacement of the aircraft from the centre of the approach path, but the term $D\phi_b$, being dependent upon the angular displacement $\sigma$, tends to annul these errors.

When eventually the aircraft has descended to the height at which it is to be brought to the wings-level condition, that is to say, to the height set in the height selector 23 for the commencement of the land phase, there is a change in the signal current supplied to the aileron channel via the leads 64. The switching network 59 in response to this change causes the input demand to the servo system which controls the shaft 71 to be changed to zero, thereby reducing the demanded bank angle to zero and maintaining it at this value. The aircraft is consequently rolled to the wings-level condition, and since in the "sideslipping" mode the heading of the aircraft is already maintained along the centre-line of the runway, this rolling manoeuvre positions it correctly for touchdown. The rudder angle required to maintain the aircraft heading along the centre-line is substantially the same after the rolling manoeuvre as before, and the error term $(\psi-\psi_0)$ which continues to be effective in the rudder channel ensures that the aircraft remains aligned with the centre-line.

The fact that the heading error term $(\psi-\psi_0)$ is effective throughout the landing manoeuvre from the glide phase ensures that any error or mal-function of the flight compass 1 or rudder channel can be detected, and the appropriate corrective action taken, before the last critical stages of the manoeuvre are reached. In prior systems where the aircraft is partly headed into the wind the error term $(\psi-\psi_0)$ is normally not made effective until the operation of kicking-off drift at which stage there is little time for corrective action.

When the "mixed" mode has been selected the demand $(D\zeta)_d$ applied to the rudder actuator 36 is dependent upon the pendulum angle $\phi_p$ ($k$ of finite value), as well as upon the heading error $(\psi-\psi_0)$. The component of the demand which is dependent upon the pendulum angle $\phi_p$ gives rise in the steady state to a drift angle such that part of the cross-wind component is counteracted by bank and the remainder by heading the aircraft partly into the wind. (Although the component of the demand which gives rise to the heading error in this case is dependent upon the pendulum angle $\phi_p$, it may instead be made dependent specifically upon the actual bank angle $\phi$, or the demanded bank angle $\phi_d$, however, the use of the angle $\phi_p$ is preferred since this provides more stable control.) Eventually when the aircraft has descended to the height set in the height selector 23, the switching network 22 becomes effective to remove from the rudder-demand the component dependent upon $\phi_p(k=0)$. As a result the drift angle is eliminated in an operation, comparable with kicking-off drift, which takes place at the same time as the aircraft is rolled to the wings-level condition in response to the reduction to zero of the demanded bank angle $\phi_d$ in the aileron channel. The operation of the aileron channel throughout the "mixed" mode is basically the same as for the "sideslipping" mode.

The "mixed" mode is preferred particularly where strong cross-wind components are encountered and is intended to avoid the requirement for unduly large aileron and rudder angles and undesirably large angles of bank. A steady sideslipping manoeuvre may require the maintained application of aileron, rudder, and bank angles, the particular values depending for any particular strength of cross-wind upon the individual aircraft used. The aim with the "mixed" mode is to ensure that the aileron and rudder angles do not normally exceed say one half or two thirds of the maximum values possible, so as to leave an adequate range of movement for correcting transient disturbances, and to limit the bank angle to an acceptable value (of, for example, five degrees).

Instead of making the value $k$ in the rudder control law a constant, it may be made to be dependent upon the strength of the cross-wind. In particular, $k$ may itself be made to depend upon the pendulum angle $\phi_p$ (or alternatively the actual or demanded bank angle) in such a way that for small values (for example less than four degrees) of the angle $\phi_p$ its value is zero or small but for larger values of the angle $\phi_p$ its value increases rapidly. This situation therefore provides that drift is permitted during an approach only when its presence is desirable to limit the aileron and rudder angles and the angle of bank. The variation of $k$ in dependence upon the pendulum angle $\phi_p$ may be made, for example, by applying the signal derived by the pendulum unit 3 as a control signal to a non-linear circuit introduced between the phase-lag network 21 and the switching network 22 of the rudder channel.

The rudder channel may be further modified in order to improve its dynamic response when, during a "mixed" mode of approach, drift angle is eliminated at the height set in the height selector 23. With this modification the magnetic amplifier 19 is provided with a further control winding and the direct current signal which is dependent upon the heading error $(\psi-\psi_0)$ and which is derived by the demodulator 15 is applied directly to this further control winding. In addition, the phase-advance network 18 is replaced by a transientising network having a transfer function $[(N_1-1)\tau_1D]/[1+\tau_1D]$, and switching network is introduced between the demodulator 15 and the transientising network. This switch network is responsive to the signal current supplied by the height selector 23 in such a way that the transientising network is supplied with the heading-error signal only when the aircraft has descended to the set height and the drift angle is to be eliminated. The supply of the heading-error signal to the magnetic amplifier 19 via the transientising network results in the application of an additional pulse in the rudder-demand at this time, such pulse tending to increase the speed with which the drift angle is eliminated. The operation of the modified rudder channel prior to the supply of the heading-error signal to the transientising network is effectively the same as when unmodified, the only difference being that the function $f_1(D)$ in control law (i) is replaced by unity. In the modified system the combined effect of the heading-error signal as supplied directly to the magnetic amplifier 19 and as supplied via the transientising network after the set height has been reached, is the same as the effect of the same signal as supplied via the phase-advance network 18 of the unmodified system, since:

$$1+[(N_1-1)\tau_1D]/[1+\tau_1D]=f_1(D)$$

Although in the aileron channel described above the signal dependent upon the displacement of the aircraft from the approach path is provided throughout by the ILS localiser receiver 4, use may be made instead during the later stages of the landing manoeuvre of the signal provided by a receiver of a leader-cable guidance system such as, for example, that described in the aforementioned British patent specification No. 820,319. The signal provided by a leader-cable receiver provides a more direct measure of the lateral displacement of the aircraft from the centre-line of the runway and may be switched to the modulator 40 in place of the signal from the receiver 4 when the aircraft has reached an appropriate stage of the landing manoeuvre. In normal circumstances it is necessary at the same time as switching from the the ILS localiser receiver 4 to the leader-cable receiver, to change the values of the resistors 42, 52 and 54.

With the system of rudder and aileron channels described with reference to the drawings, the aircraft is controlled automatically in accordance with the rudder and aileron demands. This is not essential since demands for bank and any drift angle may be used as directions to the pilot which if followed by him achieve substantially the same result. The bank demand may be communicated to the pilot visually using, for example, an indicator such as described in British patent specification No. 853,034. In particular the indicator may be in the form of a cylinder which has a helical band of a distinctive colour upon its surface (making the cylinder comparable in appearance with a "barber's pole"), and which is rotated at a rate and in a sense dependent upon the amplitude and sense respectively of the relevant demand.

We claim:

1. An aircraft flight control system for use during a landing maneuver, comprising means for providing a first control signal dependent upon displacement of the aircraft laterally from a predetermined approach path, means responsive to acceleration of the aircraft athwartships to provide a second control signal dependent upon said athwartship acceleration, means responsive to said first and second signals for deriving a demand for bank of the aircraft, said demand having a first component that is dependent upon said first signal to demand bank in a sense to reduce said displacement towards zero and a second component that is dependent upon said second signal to demand bank in a sense for reducing said athwartship acceleration towards zero by sideslip of the aircraft, control means for controlling the aircraft in bank in accordance with the bank demand, means for providing a third control signal in accordance with difference between the heading of the aircraft and a predetermined heading aligned with the approach path, means for providing a fourth control signal dependent upon bank of the aircraft, means responsive to said third and fourth control signals for deriving a demand for yaw of the aircraft in accordance with a predetermined relationship for maintaining said heading difference dependent upon bank of the aircraft, and control means for controlling the aircraft in yaw in accordance with the yaw demand.

2. An aircraft flight control system for use during a landing maneuver, comprising means for providing a first control signal dependent upon lateral displacement of the aircraft laterally from a predetermined approach path, a pendulum unit for providing a second control signal in accordance with both bank angle and athwartship acceleration of the aircraft, said pendulum unit including a pendulum mounted to pivot about an axis aligned with the roll axis of the aircraft and said second signal being derived in accordance with angular displacement of the pendulum from a datum axis parallel to the yaw axis of the aircraft, means responsive to said first and second signals for providing demand for bank of the aircraft, said demand having a first component that is dependent upon said first signal to demand bank in a sense to reduce said lateral displacement towards zero and a second component that is dependent upon said second signal to tend to demand bank equal to said angular displacement of the pendulum, aileron control means for controlling ailerons of the aircraft to bank the aircraft in accordance with the bank demand, means for providing a third control signal in accordance with difference between the heading of the aircraft and a predetermined heading aligned with the approach path, means responsive to said second and third control signals for deriving a demand for yaw of the aircraft required to maintain said heading difference equal to a predetermined function of said angular displacement of the pendulum, and control means for controlling the aircraft in yaw in accordance with the yaw demand.

3. An aircraft flight control system for use during a landing maneuver, comprising means for providing a first control signal in accordance with lateral displacement $\sigma$ of the aircraft from a predetermined approach path, a lateral pendulum unit for providing a second control signal in accordance with a pendulum-displacement angle $\phi_p$ that is dependent upon both bank angle and athwartship acceleration of the aircraft, means for providing a third control signal in accordance with bank angle $\phi$ of the aircraft, means responsive to said first, second and third signals for providing a fourth control signal in accordance with difference between said bank angle $\phi$ and a demanded bank angle $\phi_d$ computed as a function of both $\sigma$ and $\phi_p$, the demanded bank angle $\phi_d$ being dependent upon said displacement $\sigma$ to demand bank of the aircraft in a sense to reduce said displacement towards zero and being dependent upon the pendulum angle $\phi_p$ in a sense to demand bank of the aircraft tending towards equality with the pendulum angle $\phi_p$, means responsive to the second control signal for providing a fifth control signal in accordance with rate of change of the pendulum angle $\phi_p$, means responsive to said fourth and fifth control signals for controlling movement of ailerons of the aircraft to tend to reduce to zero both said difference between angles $\phi$ and $\phi_d$ and said rate of change of the pendulum angle $\phi_p$.

4. An aircraft flight control system for use during a landing maneuver, comprising means for providing a first landing control signal in accordance with lateral displacement of the aircraft from a predetermined approach path, a lateral pendulum unit for providing a second control signal in accordance with a pendulum-displacement angle that is dependent upon both bank angle and athwartship acceleration of the aircraft, means responsive to said first and second control signals for controlling the aircraft in roll to tend to maintain said displacement zero and the angle of bank equal to the pendulum angle, means for providing a third control signal in accordance with difference between the heading of the aircraft and a predetermined heading aligned with the approach path, and means responsive to said second and third control signals for cotnrolling the aircraft in yaw to tend to maintain a predetermined relationship between said difference and the pendulum angle such that the effect of cross-wind is compensated partly by heading the aircraft into the wind.

5. An aircraft flight control system for use during a landing maneuver, comprising means for providing a first control signal in accordance with lateral displacement of the aircraft from a predetermined approach path, a lateral pendulum unit for providing a second control signal in accordance with a pendulum-displacement angle that is dependent upon both bank angle and athwartship acceleration of the aircraft, roll-control means responsive to said first and second control signals for controlling the aircraft in roll to tend to maintain said lateral displacement zero and the angle of bank equal to the pendulum angle, means for providing a third control signal in accordance with difference between the heading of the aircraft and a predetermined heading aligned with the approach path, yaw-control means which is switchable selectively to operate in either of two modes, the yaw-control means when switched to operate in a first of the two modes being responsive to said second and third control signals for controlling the aircraft in yaw to tend to maintain the heading difference dependent upon the pendulum angle, and when switched to operate in the second of the two modes being responsive to said third signal for controlling the aircraft in yaw to tend to maintain said heading difference zero, and means for switching the yaw-control means from the first operational mode to the second operational mode in response to descent of the aircraft to a predetermined height.

6. An aircraft flight control system for use during a landing maneuver, comprising means for providing a first control signal in accordance with lateral displacement of the aircraft from a predetermined approach path, means for providing a second control signal in accordance with acceleration of the aircraft athwartships, bank-demand computing means which is switchable selectively from a first mode of operation to a second mode of operation, the bank-demand computing means when operative in said first mode being responsive to said first and second signals for providing a demand for bank of the aircraft computed to reduce said displacement and athwartship acceleration to zero, and the bank-demand computing means when operative in said second mode providing a demand for zero bank angle of the aircraft, roll-control means for controlling the aircraft in roll in accordance with the bank demand provided by the bank-demand computing means, and means for switching the bank-demand computing means from the first operational mode to the second operational mode in response to descent of the aircraft to a predetermined height.

7. An aircraft flight control system for use during a landing maneuver, comprising means for providing a first control signal in accordance with lateral displacement of the aircraft from a predetermined approach path, a lateral pendulum unit for providing a second control signal in accordance with a pendulum-displacement angle that is dependent upon both bank angle and acceleration of the aircraft athwartships, bank-demand computing means which is switchable selectively from a first mode of operation to a second mode of operation, the bank-demand computing means when operative in said first mode being responsive to said first and second signals for providing a demand for bank of the aircraft computed to tend to reduce said lateral displacement towards zero with the aircraft banked at an angle equal to the pendulum angle, and the bank-demand computing means when operative in said second mode providing a demand for zero bank angle of the aircraft, roll-control means for controlling the aircraft in roll in accordance with the bank demand provided by the bank-demand computing means, means for automatically switching the bank-demand computing means from its first operational mode to its second operational mode in response to descent of the aircraft to a predetermined height, means for providing a third control signal in accordance with difference between the heading of the aircraft and a predetermined heading aligned with the approach path, yaw-control means which is switchable selectively to operate in either of two modess, the yaw-control means when switched to operate in a first of its two modes being responsive to said second and third control signals for controlling the aircraft in yaw to tend to maintain the heading difference dependent upon the pendulum angle, and when switched to operate in the second of its two modes being responsive to said third signal for controlling the aircraft in yaw to tend to maintain the heading difference zero, and means for automatically switching the yaw-control means from its first operational mode to its second operational mode in response to descent of the aircraft to said predetermined height.

8. An aircraft flight control system for use during a landing maneuver, comprising first means for providing a first control signal dependent upon displacement of the aircraft laterally from a predetermined approach path, second means responsive to acceleration of the aircraft athwartships to provide a second control signal dependent upon said athwartship acceleration, third means responsive to said first and second signals for deriving a demand for bank of the aircraft, said demand having a first component that is dependent upon said first signal to demand bank in a sense to reduce said displacement towards zero and a second component that is dependent upon said second signal to demand bank in a sense for reducing said athwartship acceleration towards zero by sideslip of the aircraft, fourth means responsive to the actual bank of the aircraft and to said bank demand to derive a third signal dependent upon difference between the actual and demanded bank of the aircraft, fifth means for deriving a bank control command dependent upon said difference represented by said third signal, said fifth means including means for providing in said command a main component dependent upon said difference and means for providing additionally in said command a distinct roll-countering component dependent upon said athwartship acceleration, and control means responsive to said bank-control command for controlling the aircraft in bank to reduce both said main and roll-countering components to zero.

9. An aircraft flight control system for use during a landing maneuver, comprising means for providing a first control signal dependent upon lateral displacement of the aircraft from a predetermined approach path, a lateral pendulum unit including a pendulum mounted to pivot with respect to the aircraft about an axis parallel to the roll axis of the aircraft, means for supplying a second control signal in accordance with angular displacement of the pendulum from a datum axis parallel to the yaw axis of the aircraft, means responsive to said first and second signals to derive a demand for bank of the aircraft having a first component that is dependent upon said first signal to demand bank in a sense to reduce said lateral displacement towards zero and a second component that is dependent upon said second signal to demand bank equal to said angular displacement of the pendulum, means responsive to the actual bank of the aircraft and to said bank demand to derive a third signal dependent upon difference between the actual and demanded bank of the aircraft, means for deriving a fourth signal dependent upon rate of change of the pendulum angular displacement, and control means responsive to said third and fourth signals for controlling the aircraft in bank to reduce both said difference and said rate of change of pendulum angular displacement to zero concurrently.

10. In an aircraft, a flight control system for use during a landing maneuver, comprising means for providing a first control signal dependent upon displacement of the aircraft laterally from a predetermined approach path, means responsive to acceleration of the aircraft athwartships to provide a second control signal dependent upon said athwartship acceleration, means responsive to said first and second signals for deriving a demand for bank of the aircraft, said demand having a first component that is dependent upon said first signal to demand bank in a sense to reduce said displacement towards zero and a second component that is dependent upon said second signal to demand bank in a sense for reducing said athwartship acceleration towards zero by sideslip of the aircraft, control means for controlling the aircraft in bank in accordance with the bank demand, means for providing a third control signal in accordance with difference between the heading of the aircraft and a predetermined heading aligned with the approach path, and control means that is responsive to said third control signal for controlling the aircraft in yaw to maintain said difference in heading zero.

11. In an aircraft, a flight control system for use during a landing maneuver, comprising means for providing a first control signal dependent upon lateral displacement of the aircraft from a predetermined approach path, a pendulum unit for providing a second control signal in accordance with both bank angle and athwartship acceleration of the aircraft, said pendulum unit including a pendulum mounted to pivot about an axis aligned with the roll axis of the aircraft and means to derive said second signal in accordance with angular displacement of the pendulum from a datum axis parallel to the yaw axis of the aircraft, means responsive to said first and second signals for deriving a demand for bank of the aircraft, said demand having a first component that is dependent upon said first signal to demand bank in a sense to reduce said lateral displacement towards zero and a second component that is dependent upon said second signal to tend to demand bank equal to said angular displacement of the pendulum, control means for controlling the aircraft in bank in accordance with the bank demand, means for providing a third control signal in accordance with difference between the heading of the aircraft and a predetermined heading aligned with the approach path, and control means that is responsive to said third control signal for controlling the aircraft in yaw to maintain said difference in heading zero.

12. A flight system for use during a landing maneuver of an aircraft, comprising means for providing a first control signal dependent upon displacement of the aircraft laterally from a predetermined approach path, means responsive to acceleration acting athwartships of the aircraft to provide a second control signal dependent upon said athwartship acceleration, means responsive to said first and second signals for deriving a demand for bank of the aircraft, said demand having a first component that is dependent upon said first signal to demand bank in a sense to reduce said displacement towards zero and a second component that is dependent upon said second signal to demand bank in a sense for reducing said athwartship acceleration towards zero by side-slip of the aircraft, means for providing a third control signal in accordance with difference between the heading of the aircraft and a predetermined heading aligned with the approach path, means for providing a fourth control signal dependent upon bank of the aircraft, and means responsive to said third and fourth control signals for deriving a demand for yaw of the aircraft in accordance with a predetermined relationship for maintaining said heading difference dependent upon bank of the aircraft.

13. An aircraft flight system for use during a landing maneuver comprising means for supplying a first signal dependent upon displacement of the aircraft laterally from a predetermined approach path, means for supplying a second signal dependent upon acceleration of the aircraft athwartships, an aileron servo-channel responsive to said first and second signals to supply an aileron-demand signal for controlling ailerons of the aircraft such as to tend to reduce said displacement to zero and in the steady state maintain it at zero by bank of the aircraft, means for supplying a third signal dependent upon any difference between the heading of the aircraft and a predetermined heading aligned with the approach path, means for supplying a fourth signal dependent upon bank of the aircraft, and a rudder servo-channel responsive to said third and fourth signals to supply a rudder-demand signal which has two components that are dependent respectively upon the heading difference and bank of the aircraft for controlling a rudder of the aircraft such as to maneuver the aircraft to adopt a heading which differs from said predetermined heading by a function of bank of the aircraft.

14. An aircraft flight system according to claim 13 wherein the means for supplying said first signal is a radio receiver for providing a signal dependent upon displacement of the aircraft in azimuth from a radio-defined approach path.

15. An aircraft flight system according to claim 13 including means for supplying to the aileron servo-channel a signal which provides a measure of the actual bank angle of the aircraft, and wherein the aileron channel includes a servo system for deriving in dependence upon said first and second signals a demand for bank angle of the aircraft, the arrangement being such that a component of the aileron-demand signal supplied by the aileron channel is dependent upon the difference between the actual and demanded bank angles such as to tend to reduce the difference to zero.

16. An aircraft flight system according to claim 15 wherein the aileron channel includes switch means which is switchable from a first state to a second state, and supply means for supplying said first and second signals to said servo system via said switch means only when said switch means is in its said first state.

17. An aircraft flight system according to claim 16 including a selector which is adapted to be set in accordance with height of the aircraft at which bank of the aircraft is to be eliminated just prior to touchdown, and means responsive to the setting of the selector and height of the aircraft to effect switching of the switching means from its first to second state when the aircraft has descended to the set height.

18. An aircraft flight system according to claim 13 including a pendulum unit for supplying a signal dependent upon the angle by which a pendulum mounted for angular displacement about an axis aligned with the roll axis of the aircraft is displaced from a datum axis parallel to the yaw axis of the aircraft, and wherein said fourth signal dependent upon bank is said signal dependent upon the pendulum displacement angle.

19. An aircraft flight system for use during a landing maneuver comprising means for supplying a first signal dependent upon displacement of the aircraft laterally from a predetermined approach path, means for supplying a second signal dependent upon acceleration of the aircraft athwartships, a first servo channel responsive to said first and second signals to supply an aileron-demand signal for controlling ailerons of the aircraft such as to tend to reduce said displacement to zero and in the steady state maintain it at zero by bank of the aircraft, means for supplying a third signal dependent upon any difference between the heading of the aircraft and a predetermined heading aligned with the approach path, means for supplying a fourth signal dependent upon bank of the aircraft, and a second servo channel that has two operative conditions, the second servo channel when operative in one of said two conditions being responsive to said third and fourth signals to supply a first rudder-demand signal having two components that are dependent respectively upon the heading difference and bank of the aircraft for controlling a rudder of the aircraft such as to maneuver the aircraft to adopt a heading which differs from said predetermined heading by a function of bank of the aircraft, and said second servo channel when operative in the other of said two conditions being responsive to said third signal to supply a second rudder-demand signal dependent upon the heading difference for controlling the rudder to reduce said difference to zero.

20. An aircraft flight system according to claim 19 wherein the means for supplying said second signal is a pendulum unit for supplying a signal dependent upon the angle by which a pendulum mounted for angular displacement about an axis aligned with the roll axis of the aircraft is displaced from a datum axis parallel to the yaw axis of the aircraft.

References Cited by the Examiner
UNITED STATES PATENTS

| | | | |
|---|---|---|---|
| 2,649,264 | 8/1953 | Slater et al. | 244—77 |
| 2,776,428 | 1/1957 | Hassler et al. | 244—77 |
| 2,808,999 | 10/1957 | Chenery | 244—77 |
| 2,830,291 | 4/1958 | Hecht et al. | 244—77 |
| 3,110,458 | 11/1963 | Bishop | 244—77 |

FERGUS S. MIDDLETON, *Primary Examiner.*

RALPH D. BLAKESLEE, *Examiner.*

D. NOON, *Assistant Examiner.*